Jan. 5, 1937.  W. E. TRENT  2,066,809
APPARATUS FOR DEPICTING A MONETARY ECONOMIC SITUATION
Filed May 10, 1934   9 Sheets-Sheet 1

Inventor
Walter E. Trent
By Bacon & Thoma
Attorneys

Jan. 5, 1937. W. E. TRENT 2,066,809
APPARATUS FOR DEPICTING A MONETARY ECONOMIC SITUATION
Filed May 10, 1934 9 Sheets-Sheet 2
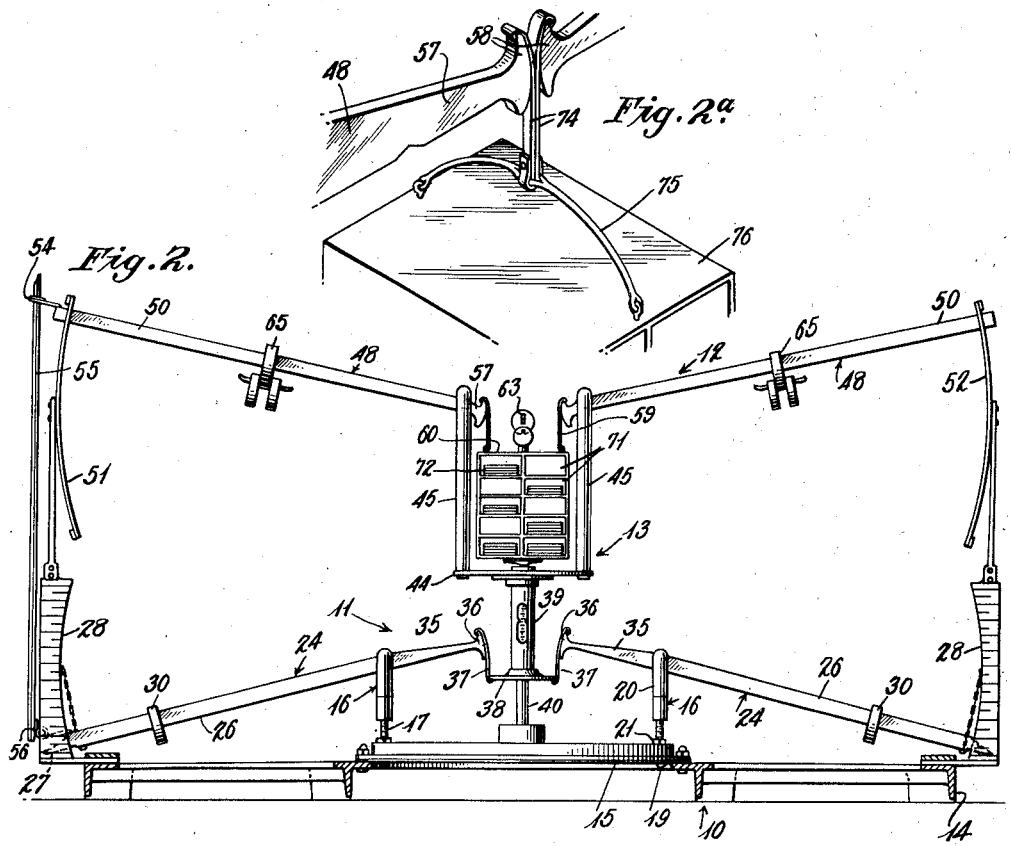
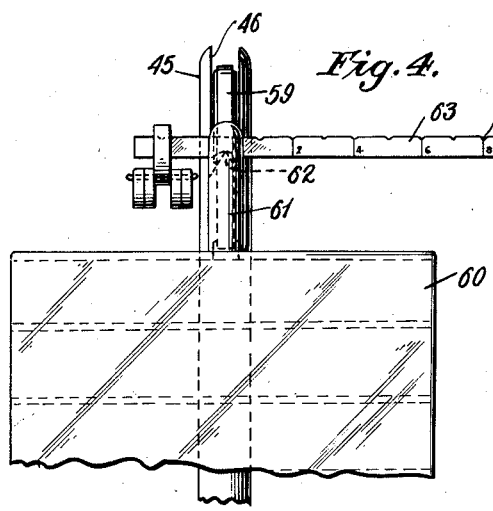
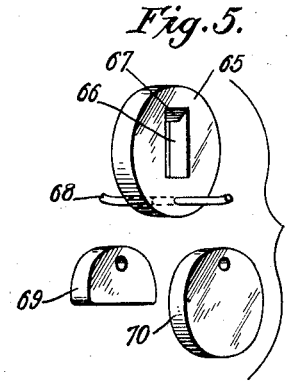
Inventor
Walter E. Trent

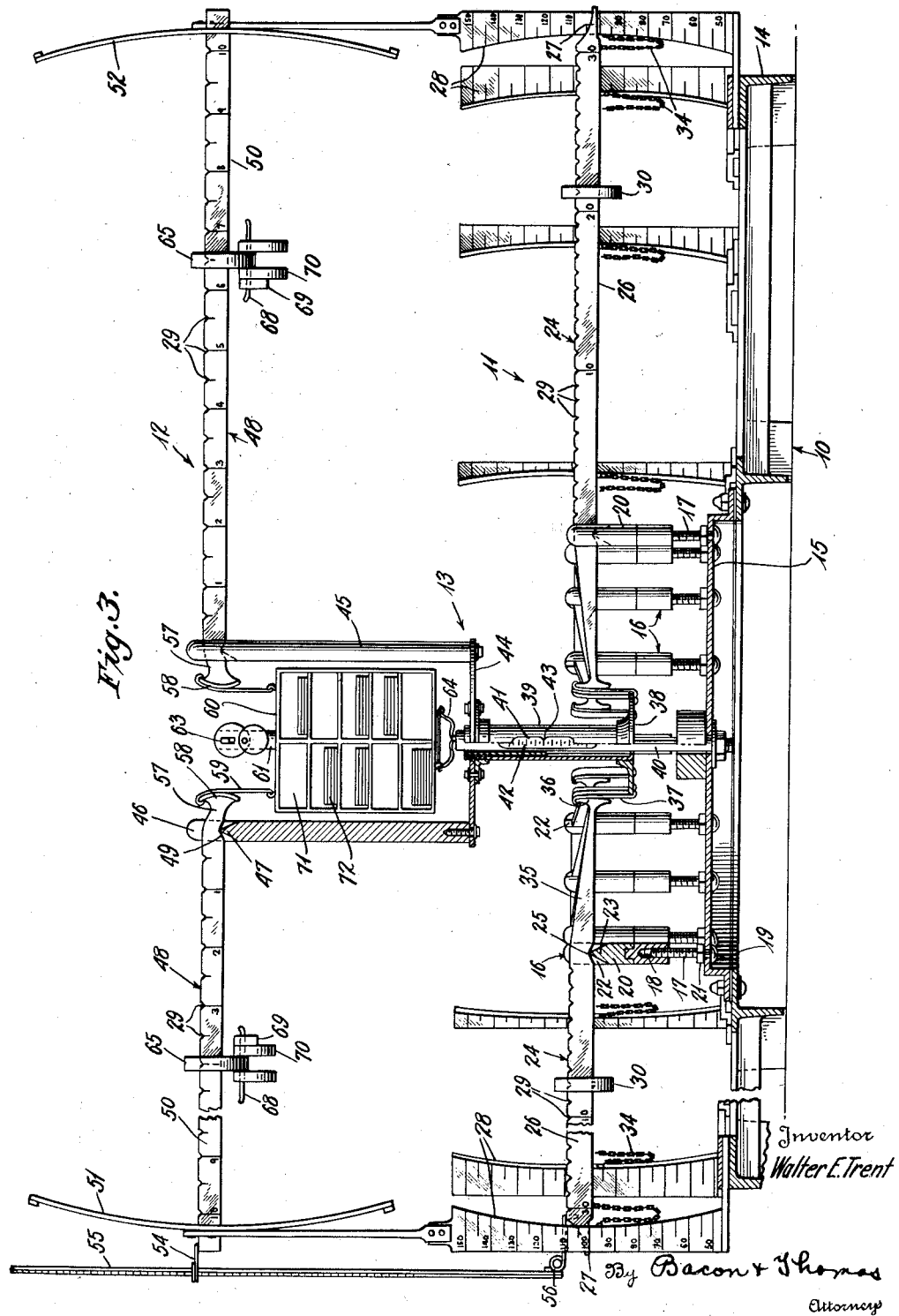

Jan. 5, 1937. W. E. TRENT 2,066,809
APPARATUS FOR DEPICTING A MONETARY ECONOMIC SITUATION
Filed May 10, 1934 9 Sheets-Sheet 4
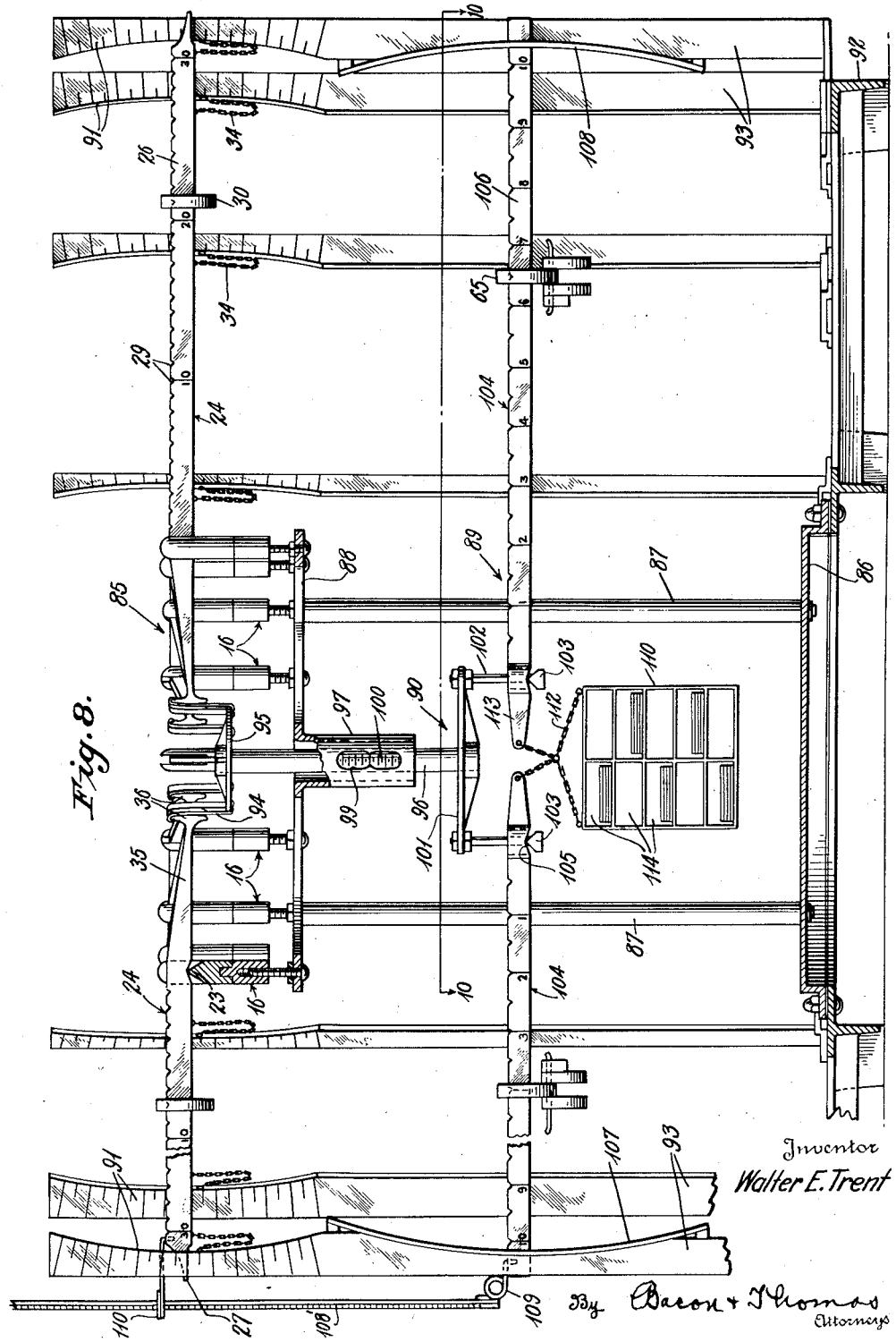

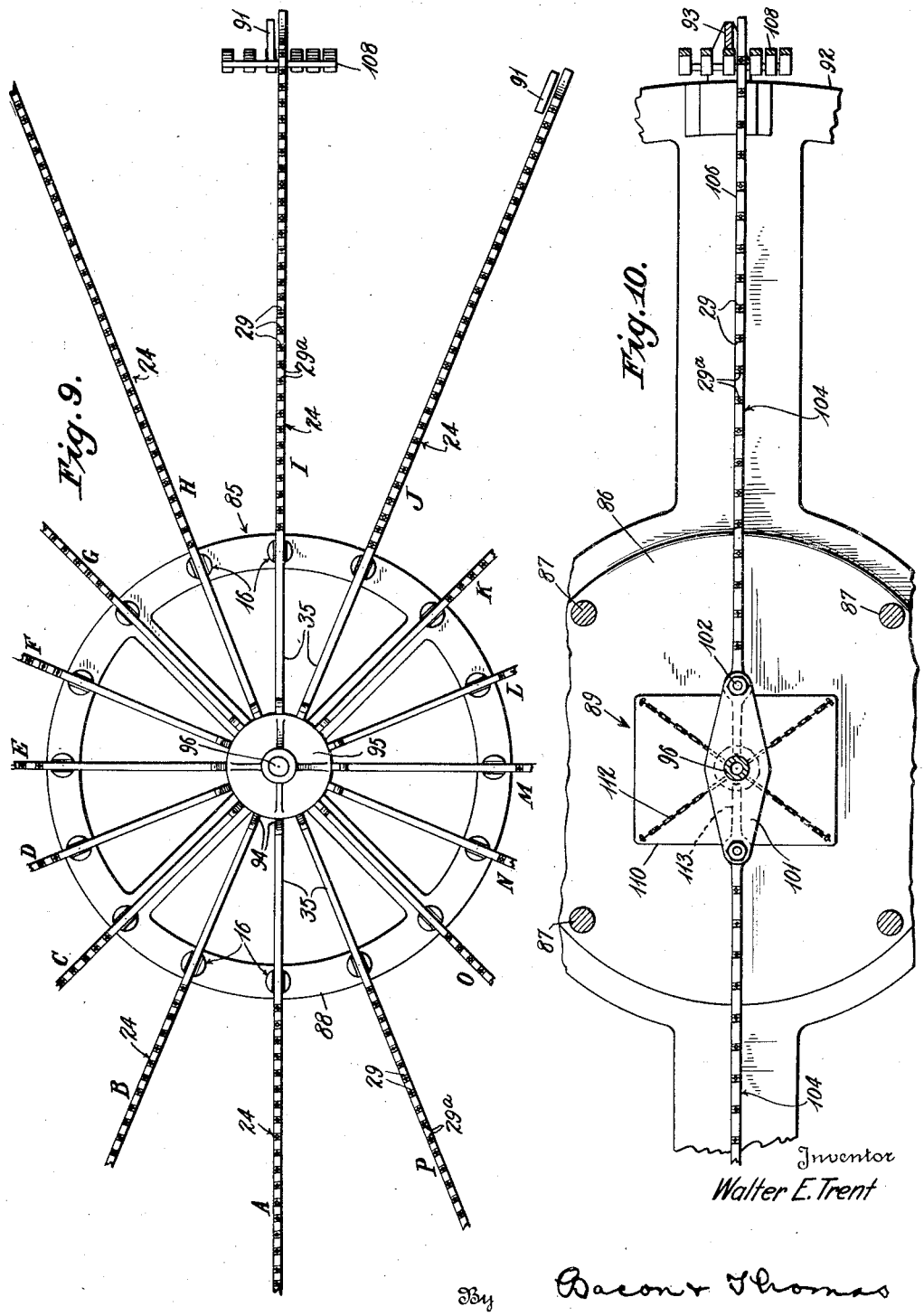

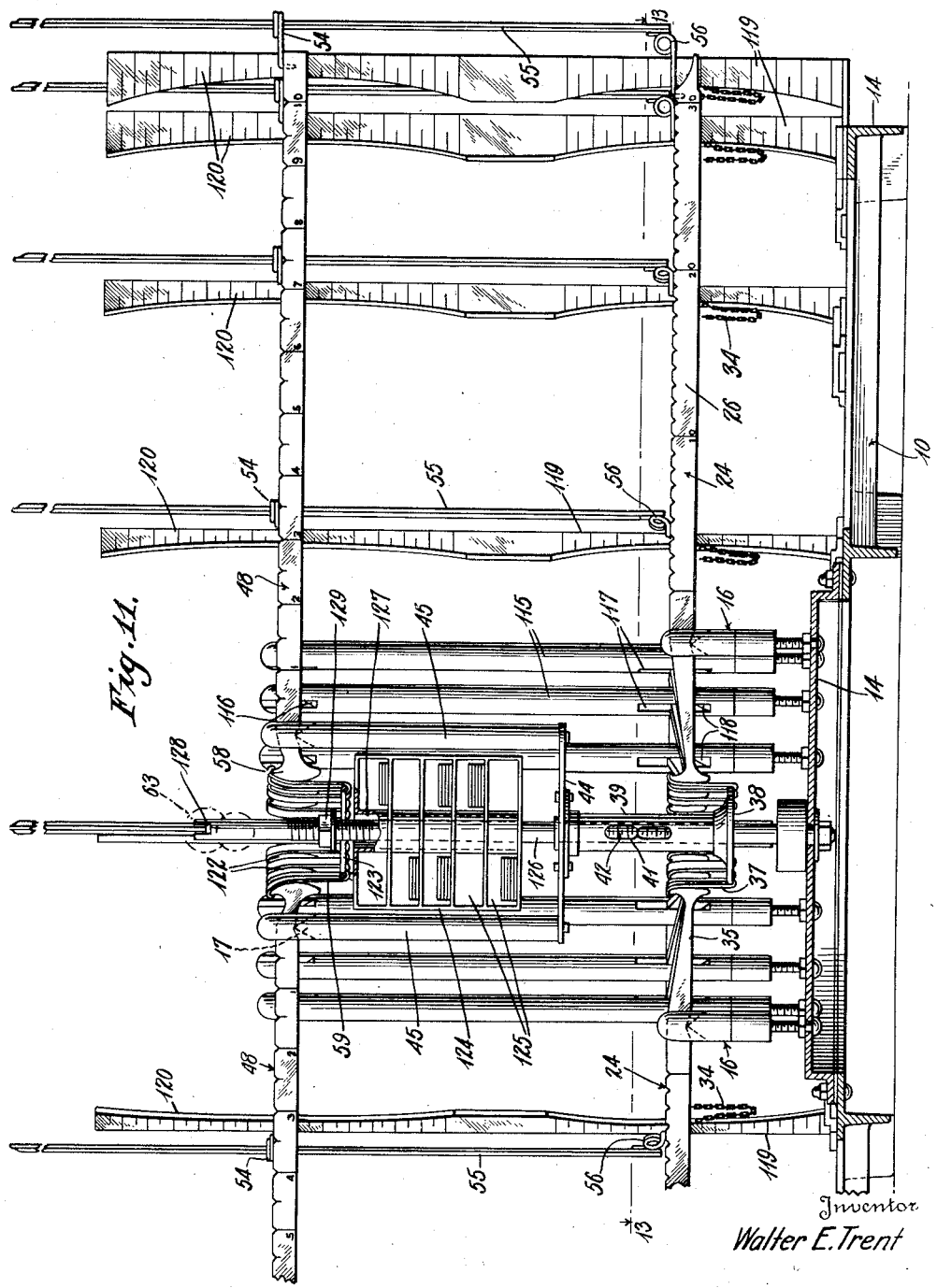

Jan. 5, 1937. W. E. TRENT 2,066,809
APPARATUS FOR DEPICTING A MONETARY ECONOMIC SITUATION
Filed May 10, 1934 9 Sheets-Sheet 7
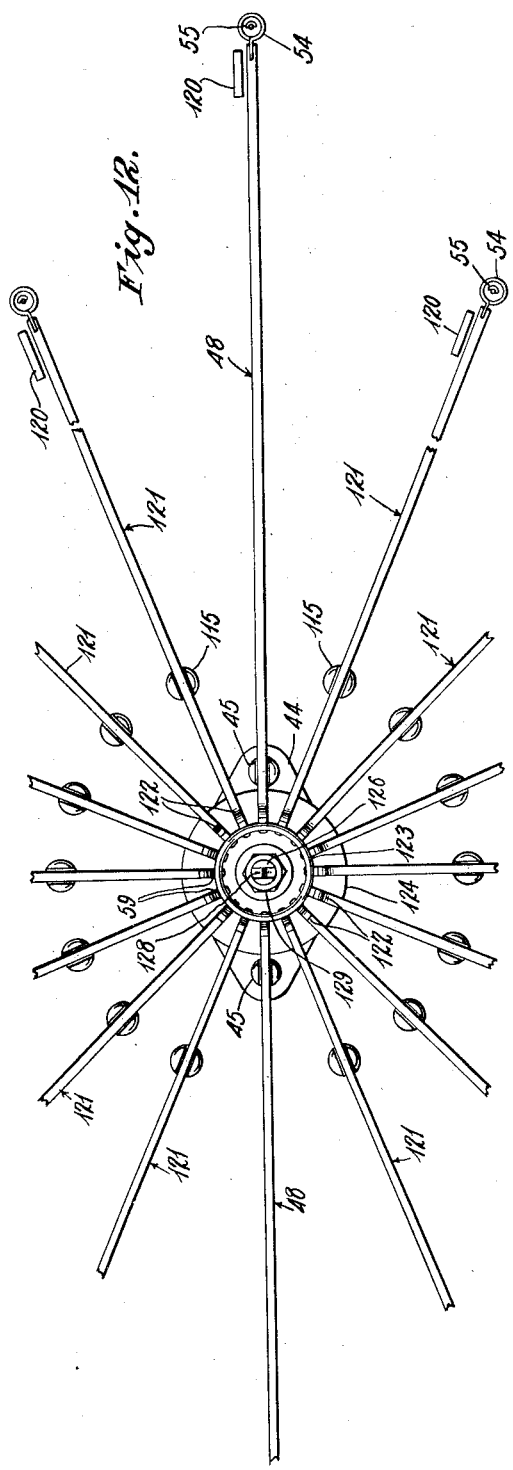
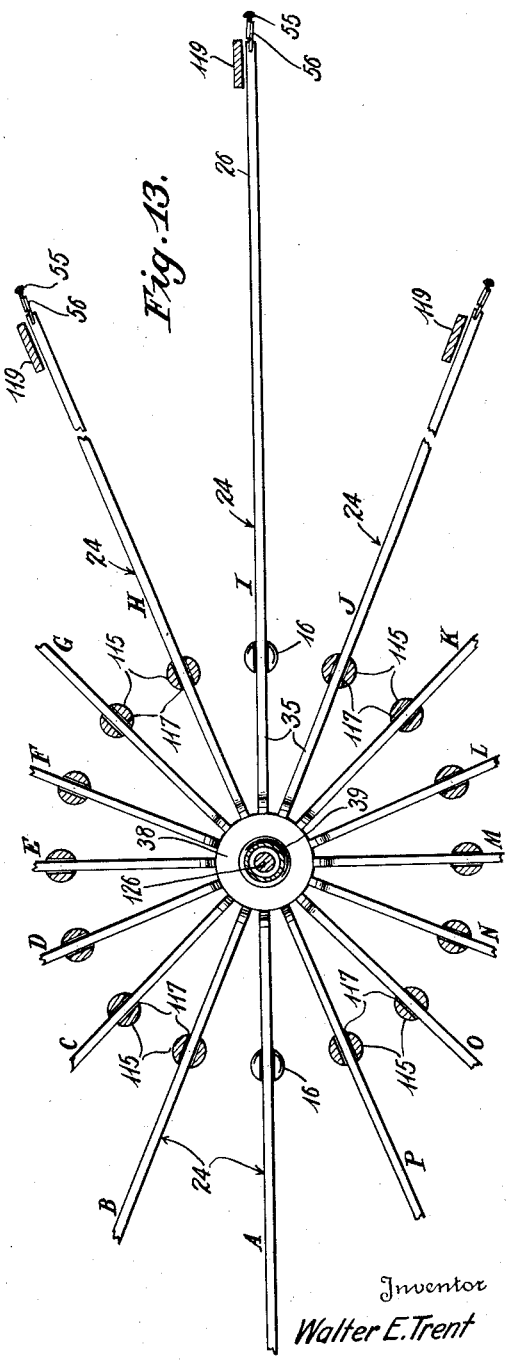
Inventor
Walter E. Trent
By Bacon & Thomas
Attorneys

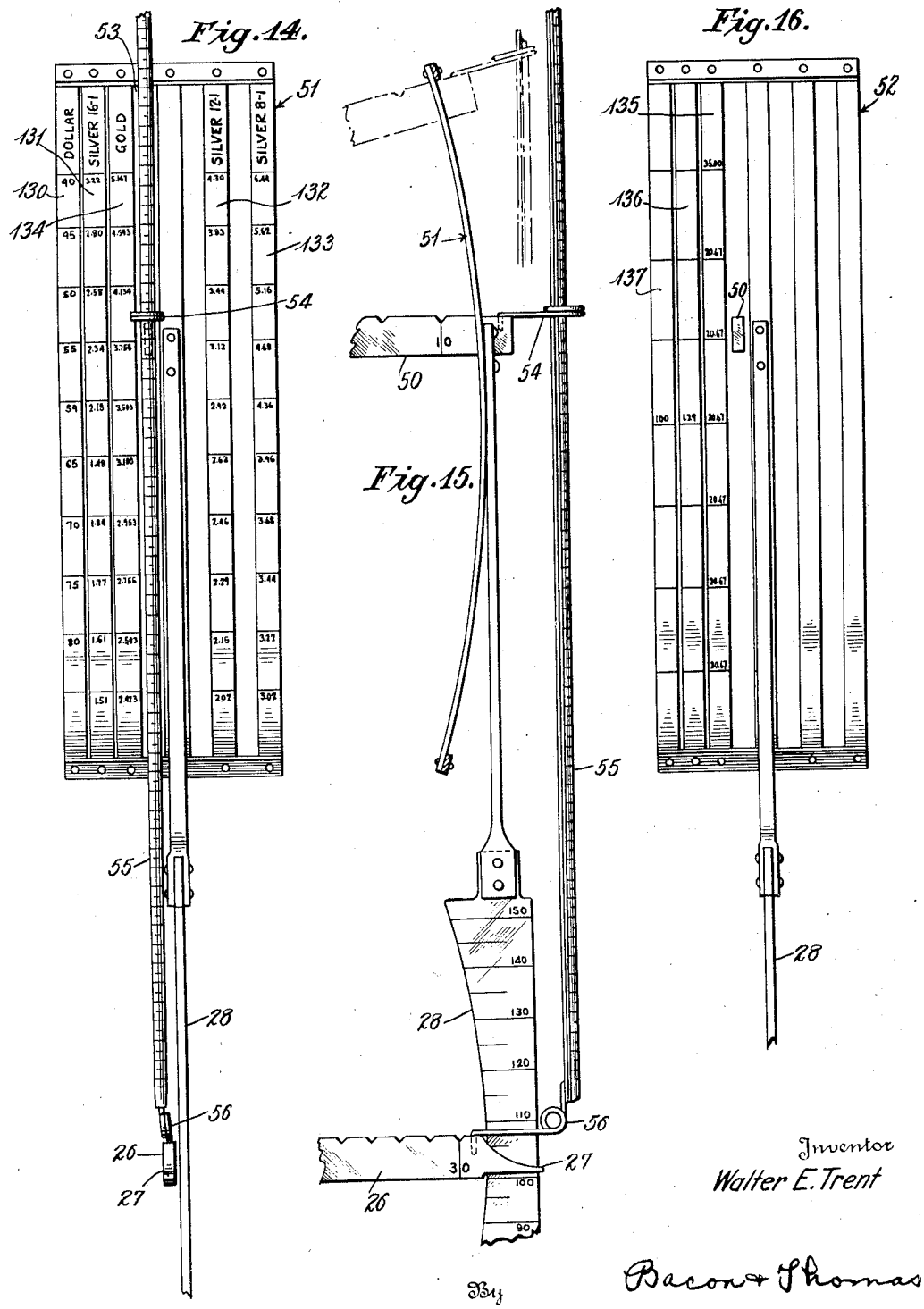

Jan. 5, 1937. W. E. TRENT 2,066,809
APPARATUS FOR DEPICTING A MONETARY ECONOMIC SITUATION
Filed May 10, 1934 9 Sheets-Sheet 9
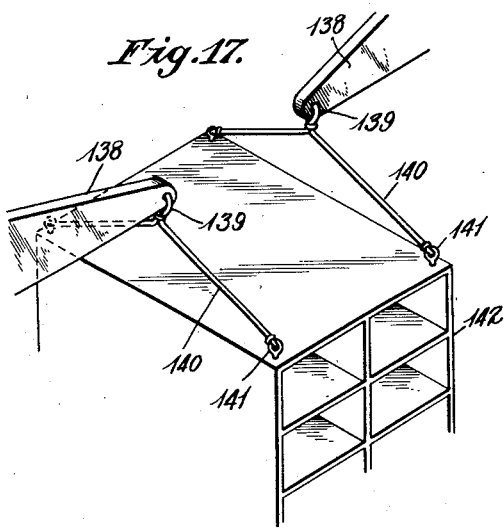
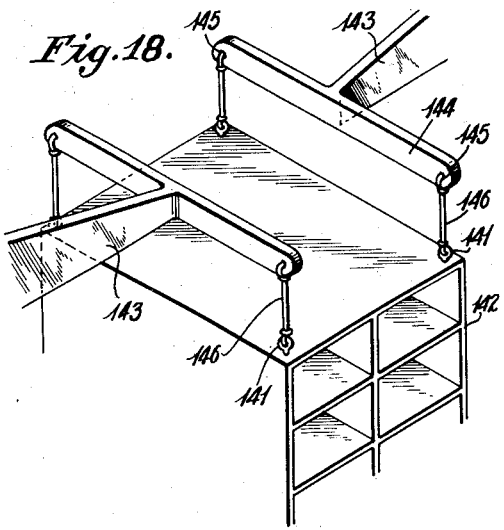
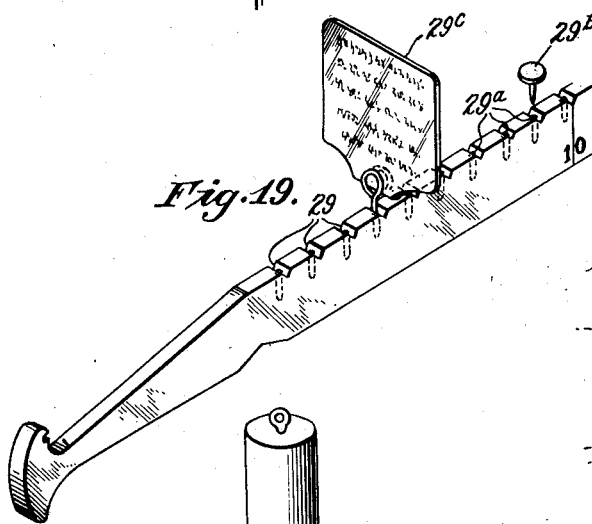
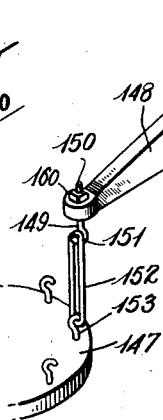
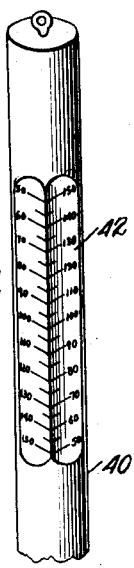
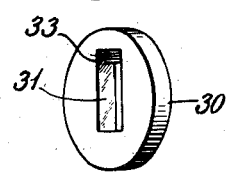
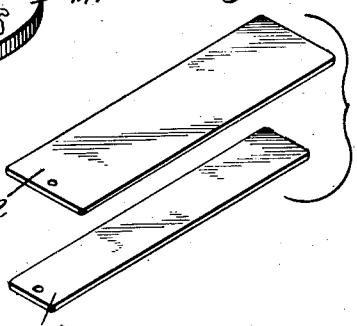
Inventor
Walter E. Trent
By Bacon + Thomas
Attorneys Patented Jan. 5, 1937

2,066,809

UNITED STATES PATENT OFFICE 2,066,809

APPARATUS FOR DEPICTING A MONETARY ECONOMIC SITUATION

Walter E. Trent, New York, N. Y.

Application May 10, 1934, Serial No. 725,014

15 Claims. (Cl. 35—24)

This invention relates to an apparatus for depicting a monetary economic situation and more particularly to an apparatus for simulating the relations between the various types of money and credits and in turn their relations to the individual and collective values of commodities and business.

The invention contemplates balancing values by using unit weights of the same mass to represent unit values of business, commerce, commodities and all kinds of money in the production of a mechanical analogy of an entire economic situation which is portrayed in divisional form, both quantitatively and kinetically.

Automatic index scales record currency velocities, commodity and business index numbers, purchasing and business power of the dollar, relation of the dollar to gold, relative values of gold and silver and other scientific values which are indispensible in achieving control of the courses of economics and industry.

The broad idea underlying the functions to be performed by the monetary economic balance is that upon this apparatus a multitudinous number of seemingly unrelated values are represented quantitatively and, by means of group differentiations upon the structure, automatically they become integrated, the degree of relationship being numerically indicated.

Primarily the monetary economic balance is utilized to simplify the understanding of the complex phases of economics; particularly to clarify in the mind the causes of the constantly changing states of the various component parts of monetary structures as they relate to one another, and to the business and commodities for which they are the financial instruments.

Specifically the monetary economic balance is a mechanism consisting of two general groups of interacting gravity balances, upon one of which is represented the values of the monetary elements, and upon the other the values of all branches of business and commodities, in such manner that with the aid of the unerring action of the forces of gravity, any economic situation which is either in or out of balance may be quantitatively depicted. In the cases of states of unbalance the actions requisite for a return to balance are clearly indicated. The values of all things to be considered are separately represented with characteristic weights and, while different as to form and coloring, they usually have the same mass. The unit weights representing the values of various classes of monies and credits are placed on two companion balances which interact with a series of horizontal radially disposed levers upon which are positioned the weights representing the values of the many classes of commodities and business and their collateral debt services; the nature of the interaction being such in general principle that an increase of weights representing a balanced monetary structure will cause a rise in the value of commodities, etc., and conversely the decrease of such weights will cause a drop in the value of commodities; and naturally any change in the weights representing the values of the commodity groups which change their total value will cause an opposite change in the value of the money group.

The monetary elements are divided into three general groups consisting of:

(1) Gold and silver, representing the metallic base;

(2) The various forms of Government and central bank currencies; and (3) Deposit credits of both Federal Reserve and non-member banks.

The old preferences and differences that formerly existed between gold certificates, Federal Reserve notes, National Bank notes, greenbacks, etc., are not recognized as having any difference amongst themselves or in their relation to gold, even in the analogies displayed of years gone by, because in times of panic they have to be treated as of one class and the metallic reserve held as a common undivided security for all.

The monetary economic balance clearly depicts how slight changes in the metallic base may induce violent changes in all groups of currencies and deposits fully exemplifying the necessity of treating them all as of one class, not only temporarily, but permanently.

All weights representing the various classes of values are positioned on the monetary economic balance so as to be responsive to the forces of gravity in such a manner that the relations existing between the various monetary values and those of business and commodities are accurately reflected in a mechanical setting which is truly analogous to the economic situation it represents.

By such means, an economic condition can be simulated in detail, and if any changes in the position of the weights happen to be necessary to establish a balance, the position of the levers with respect to the scales specifically indicate the changes that are necessary to bring equilibrium to that particular economic condition. The analogy created may be said to be three-dimensional because, corresponding to length, breadth and thickness, it is visible, kinetic, and quantitative, and as a result thereof the subject of economics becomes more precise. The subject is made comprehendible; it becomes possible not only accurately to correct existing imperfections, but to determine in advance what general effects would be caused by either proposed or anticipated changes in commodity or business values, or any monetary change.

Preferred forms of the apparatus illustrating the invention are described in the following specification and illustrated in the accompanying drawings, of which:

Figure 2 is a sectional view in elevation with all but two of the commodity levers and their fulcrums removed;

Figure 2a is a fragmentary view in perspective of a modified arrangement for attaching the monetary levers to the cage;

Figure 3 is a sectional view of the apparatus taken on lines 3—3 of Figure 1;

Figure 4 is a fragmentary view showing an auxiliary balancing lever mounted on the cage;

Figure 5 is a perspective view of certain of the weights used upon the various levers;

Figure 6 is a detail showing a modification of the commodity levers;

Figure 7 is a sectional view taken on line 7—7 of Figure 6;

Figure 8 is a vertical sectional view of a modified form of the apparatus;

Figure 9 is a fragmentary plan view of the upper portion of the apparatus shown in Figure 8;

Figure 10 is a horizontal section taken on line 10—10 of Figure 8;

Figure 11 is a vertical sectional view of a further modification of the apparatus;

Figure 12 is a fragmentary plan view of the apparatus shown in Figure 11;

Figure 13 is a fragmentary section taken on line 13—13 of Figure 11;

Figure 14 is a detail in elevation of a scale positioned adjacent the end of a monetary lever;

Figure 15 is a side view of the structure shown in Figure 14;

Figure 16 is a detail in elevation of a scale positioned adjacent the end of another monetary lever;

Figure 17 is a detail in perspective of another modification of the structure for attaching the monetary levers to the cage;

Figure 18 is a detail in perspective of a further modification of the structure shown in Figure 17;

Figure 19 is a detail in perspective of a commodity lever;

Figure 20 is a detail in perspective of a modified structure for attaching a commodity lever to the balance;

Figure 21 is a perspective view of certain forms of monetary weights;

Figure 22 is a perspective view of one form of weight to be positioned on the levers; and Figure 23 is a fragmentary view of a portion of the central standard of the apparatus of Figures 1, 2, and 3.

Figure 1:
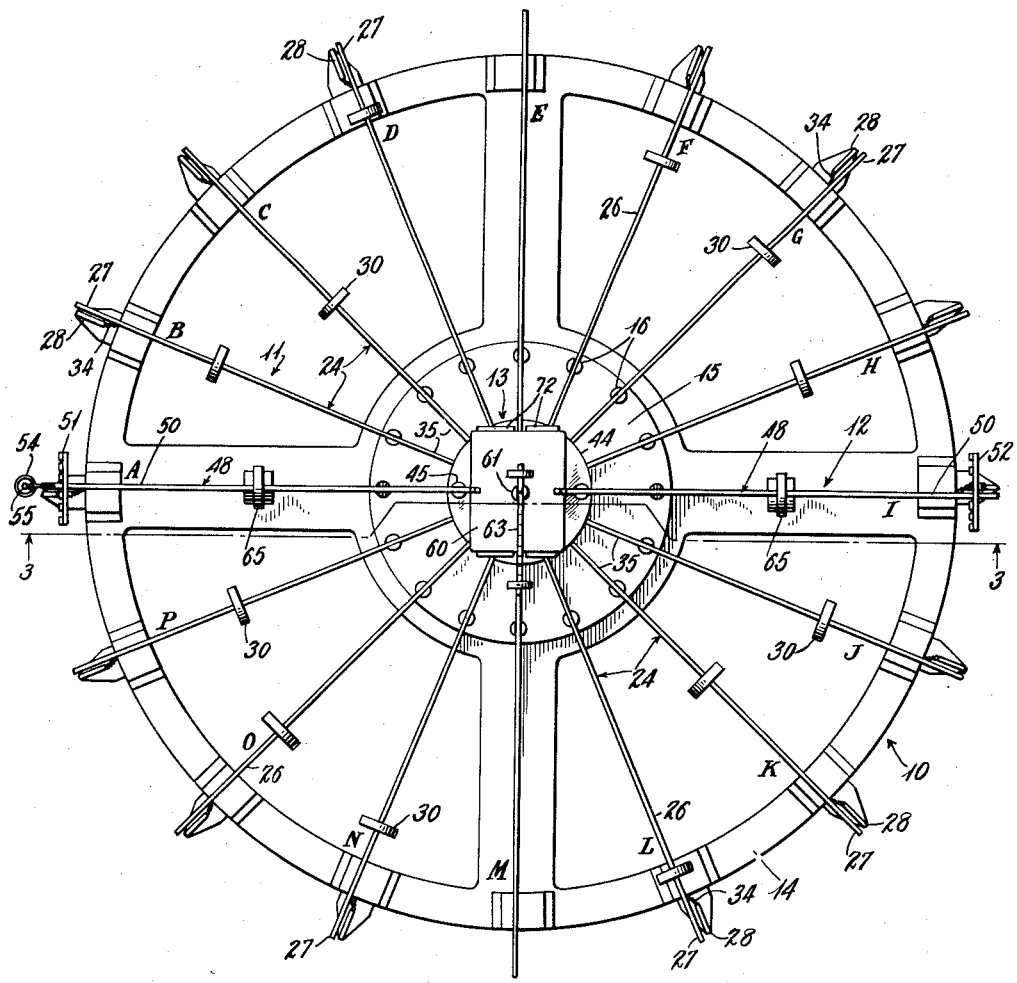
Figure 1 is a plan view of one form of the apparatus.
Figure 1:
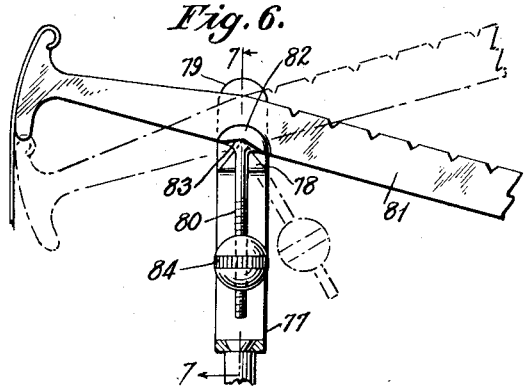

Referring more particularly to the drawings:

The monetary economic balance shown in Figures 1, 2, and 3 comprises in general four portions, namely (1) a base 10; (2) a commodity portion indicated generally at 11 (Figure 3) and including a system of commodity levers and scales supported on the base; (3) a monetary portion indicated generally at 12 and including a system of levers and scales and (4) an interconnecting portion indicated generally at 13 between the commodity portion and the monetary portion.

The base 10 is preferably of circular formation as shown in Figure 1 and includes an outer peripheral portion 14 and an inner central portion 15 which may be a separate member secured to the portion 14 as shown in Figure 3. The central portion 15 is provided with a plurality of adjustable fulcrum members 16 annularly disposed adjacent the periphery of the portion 15. The fulcrum members 16 in the embodiment shown each comprise a screw threaded stud 17 positioned in an aperture 18 formed in the portion 14 so as to extend vertically upward therefrom, a screw threaded adjusting member 19 and a fulcrum element 20. The stud 17 is locked in position in said aperture 18 by a nut 21 and receives the adjusting member 19 over its upper end. The fulcrum element 20 is mounted upon the adjusting member 19 for relative rotation therewith and is provided with a concentric circular socket in its lower surface to receive a concentric circular projection upon said adjusting member 19. The fulcrum element 16 is further provided with a slot 22 in its upper end formed to provide a knife edge 23 upon which is supported one of a plurality of commodity levers 24 positioned in the slots 22 of the fulcrum elements 16 and forming a part of the commodity portion of the apparatus. In the embodiments shown sixteen commodity levers are shown, but it is to be understood that a greater or lesser number may be employed.

The commodity levers 24 are provided with a notch 25 to receive the knife edge 23 of the fulcrum elements and comprise an arm 26 extending outwardly from the fulcrum members 16 and terminating in a point 27 positioned adjacent a vertical scale 28 mounted upon the outer portion 14 of the base 10. The arm 26 has it upper edge notched as at 29 and is provided with graduations from 0 to 30 as shown in Figure 3. Weights 30, representing values of commodities, shown in more detail in Figure 22, are adapted to be positioned upon the arm 26. These weights are preferably circular in formation and are provided with an aperture 31 formed to provide a knife edge 33 to be received by notches 29. As shown more clearly in Figure 19, the arm 26 is provided with recesses 29a extending downwardly from the lower portion of the notches 29. These recesses are adapted to receive and retain indicating pins 29b or tags 29c for the purpose of indicating the positions which the weights would occupy under other economic conditions and other economic factors. Each of the commodity levers 34 is provided with a chain 34 having one end secured to the arm 26 adjacent the outer end thereof. The other end of each chain 24 is secured to the scale 28 corresponding to said arm 26 adjacent the mid point of the scale, so that any increasing portion of the weight of the chain 34 is supported by the arm 26 as it approaches the top of the scale 28.

Each of the commodity levers 24 also includes an arm 35 which terminates adjacent the circular portion of the apparatus in an arcuate portion 26, concentric with the knife edge 23 of the fulcrum member. A flexible ribbon 37 has one end secured to the arm 35 above the arcuate portion 36 and its other portion secured to a flange 38 carried by a sleeve member 39, forming part of the inner connecting portion 13.

A central standard 40 is also supported by the base and extends through an aperture in the central portion 14 thereof upwardly within the sleeve 39. The sleeve 39 is provided with an aperture 41 through which graduations 42 upon the central standard 40 extend. As shown in Figure 3, the aperture 41 is formed to provide indicating point 43 adjacent the graduations 42. The sleeve 39 carries at its upper end a flange 44 supporting diametrically opposed fulcrum members 45 extending vertically upward therefrom. These fulcrum members are provided at their upper ends with slots 46 formed to provide knife edges 47. A monetary lever 48 having a notch 49 is positioned in each of the slots 46 so that the notch 49 receives the knife edges 47.

The monetary levers 48 are each provided with an arm 50 extending outwardly from the notch 49 and terminating adjacent monetary scales 51 and 52 each supported upon one of the commodity scales 28. The arms 50 are provided with notches 29 and recesses 29a entirely similar to the notches and recesses of the arms 26 of the commodity levers 24. The scales 51 and 52 are shown in more detail in Figures 14, 15, and 16 and each has thereon a series of graduations the purpose of which will be hereafter explained.

It will be noted that the arm 50 of one of the monetary levers 48 projects through a slot 53 in the scale 51 and is provided adjacent its end with an apertured member 54 through which a scale 55 extends. The scale 55 is pivotally mounted at 56 upon an arm 26 of one of the commodity levers 24.

The monetary levers 48 also have an arm 57 provided with an arcuate portion 58 concentric about the knife edge 47. Flexible ribbons 59 have one end attached to the arm 57 above the arcuate portion 58 and the other end secured to the upper portion of a cage 60 which is suspended from the arms 57 by the flexible ribbons 59. The cage 60, as more clearly shown in Figure 4, has a fulcrum member 61 projecting upwardly from the circular portion thereof which is provided with a knife edge 62 upon which an auxiliary monetary lever 63 is supported. Also, as more clearly shown in Figure 3, the lower portion of the cage 60 is provided with a releasable connection 64 for establishing a connection between the cage 60 and the central standard 40.

The arms 50 of the monetary levers 48 are graduated as shown in Figure 3, and are adapted to receive weights 65 representing monetary values. These weights are shown more clearly in Figure 5 and comprise a circular member having an aperture 66 formed to provide a knife edge 67 to receive the notches 29 of the monetary levers. The weight 65 may also be provided with pins 68 extending therethrough and adapted to receive apertured weights 69 and 70 also representing monetary values. Also the cage 60 is provided with a plurality of compartments 71 adapted to receive weights 72, and 73, shown more clearly in Figure 21, and also representing monetary values. The lever 63 is also adapted to receive weights 65 in notches 29 provided thereon. It is intended that weights 30, 65, and 72 should all have the same mass but they are made in different configurations so as to indicate by their different shapes the different values represented. The weights 69 and 70 have masses which are a fractional part of the mass of the weight 65, and the weights 73 have masses which are fractions of the mass of the weights 72.

It will be seen from the above description that in the different modifications shown in Figures 1, 2, and 3 with the detachable connection 64 removed, an increase in the weight positioned upon any of the arms 26 of the commodity levers 24 or the moving of any of the weights 30 toward the outer end of arm 26 will cause all of the outer ends of the commodity levers 26 to descend relative to the scales 28 and that through the connection portion 13 of the apparatus the entire monetary portion 12 including the outer ends of the arms 50 of the monetary levers 48 will be raised relative to the scales 51 and 52. Conversely, a decrease in the effective weight upon any or all of the arms 26 of the commodity levers 24 will cause the outer ends of the commodity levers 24 to rise relative to the scales 28 and allow the monetary portion 12 of the machine including the outer ends of the monetary levers 48 to descend relative to the scales 51 and 52. The upward movement of the outer ends of the monetary levers 24 will be resisted by an increase of weight due to the action of the chains 34 and also a downward motion of the outer ends of the monetary levers 24 will be resisted by a decrease in weight due to the action of the chains 34. Also any increase in weight upon the monetary levers 48 or the cage 60 will result in a lowering of the monetary portion of the machine, an upward movement of the outer ends of the commodity levers and a decrease in weight upon the monetary portion of the machine will cause an upward movement of this portion and a downward movement of the outer ends of the commodity levers 24 relative to the scales 28. Also the monetary levers 48 and cage 60 may move independently of the commodity levers 24. An increase in weight upon the monetary levers 50 or a shifting of the weights thereon toward the outer end of the levers will cause a lowering of the outer ends of these levers and an upward movement of the cage 60 in addition to the general movement of the monetary portion of the apparatus, as will also be the case if the weight carried by the cage 60 is decreased. Conversely, an increase of the weight carried by the cage 60 or a decrease of the effective weight upon the arms 50 will cause an upward movement of the outer ends of the arms 50 in addition to the general movement of the monetary portion of the machine. It is to be noted that a mere shifting of the weights upon monetary levers 48 will not have any effect upon the position of the commodity levers 24.

If the detachable connection 64 between the cage 60 and the standard 40 is placed in position and the values of the weights upon the various levers are such that this connection is under tension, any shifting of the weights upon the monetary levers 48 will result in a movement of the commodity levers 24 and any increase or decrease of weight upon either the monetary levers 48 or the cage 60 without a corresponding change in weight upon the other, will cause a movement of the commodity levers 24 in addition to the movement of these levers caused by a general movement of the monetary portion of the machine.

Conversely, any movement of the commodity levers due to a change in the weight thereof will be reflected in an angular movement of the monetary levers 48 in addition to the general motion of translation of the monetary portion of the machine. It is to be noted that by adjusting the fulcrum member 20 supporting any one of the commodity levers 24, the position of the outer end of said lever 24 relative to its corresponding scale 28 may be changed without any appreciable movement of the sleeve 29 and the monetary portion of the machine.

The manner in which the various movements and positions of the various portions of the machine are used to depict an economic situation will be explained after the other modifications of applicant's apparatus have been described.

In Figure 2a is shown a modification of the means for attaching the monetary levers to the cage. In this modification the arcuate portions 58 of the monetary levers 45 are positioned closely adjacent each other and flexible ribbons 74 depending therefrom are secured to a bail 75 which is in turn secured to the top surface of a cage 76.

Also in Figures 6 and 7 is shown a modification of the means for resisting movement of the commodity levers 24 by increasing the weight upon the levers when the outer ends of the levers move upwardly and substracting weight when these ends move downwardly. In this modification a forked fulcrum element 77 is provided with knife edges 78 upon the inner portions of the forks 79. The knife edges 78 are spaced from each other to permit a downwardly projecting member 80 secured to a commodity lever 81 to pass freely between the knife edges. The lower edge of the commodity lever 81 is provided with a laterally extending portion 82 having lateral notches 83 formed therein to receive the knife edges 78. The downwardly projecting member is screw threaded to receive a weight 84 adjustable thereon. As shown in Figure 6, the member 80 is in a vertical position when the outer end of the commodity lever 81 is in its lowermost position and an upward movement of the outer end of the commodity lever will bring the weight 84 into position to be acted upon by gravity to return the lever 81 to its lowermost position.

In Figures 8, 9, and 10 is shown a second modification of the entire apparatus for depicting an economic condition. In this modification the commodity portion of the machine 85 is supported upon a base 86 by means of long vertical columns 87 projecting upwardly from the base and rigidly supporting a fulcrum plate 88. It will be noted that the commodity portion 85 of the machine, in this modification, is supported above the monetary portion 89 by an interconnecting portion indicated generally at 90. A series of equally spaced fulcrum members 16 are secured to the fulcrum plate 80 adjacent the periphery thereof and project upwardly to support upon knife edges 23 a plurality of commodity levers 24. The fulcrum members 16 and their associated commodity levers 24 may be identical to the fulcrum members 16 and commodity levers 24 respectively of the modification shown in Figure 3. Also in the embodiment shown in Figure 8 there are provided sixteen fulcrum members 16 and commodity levers 24, but this number may be varied without departing from the invention. The outer ends of the arms 26 of the commodity levers 24 are positioned adjacent commodity scales 91 which are supported on the outer peripheral portion 92 of the base 86 and have vertical portions 93 extending upwardly from the base which terminate in the scales 91. The commodity levers 24 and scales 91 may be provided with chains 34 as shown in Figure 8 or with weights 84 shown in Figure 6 for providing a controlled resistance to movement of these levers. The arms 35 of the commodity levers terminate at their inner end in arcuate portions 36 concentric about the knife edges 23 and have flexible ribbons 94 secured thereto. The lower ends of the flexible ribbons 94 are secured to a flange 95 carried by a central vertical member 96 which extends downwardly through a sleeve 97 carried by the fulcrum plate 88. The sleeve 97 is apertured at 99 to expose graduations 100 upon the central vertical member 96. The central vertical member 96 terminates at its lower end in a cross member 101 having depending fulcrum members 102 secured to the ends thereof. The fulcrum members 102 carry outwardly projecting knife edges 103 which support monetary levers 104 by engagement in notches 105 formed in the monetary levers 104.

The outer arms 105 of the monetary levers are formed entirely similar to the arms 50 of the monetary lever shown in Figure 3 and terminate adjacent scales 107 and 108 each mounted upon the supporting portion 93 of a scale 91. The graduations upon the scales 107 and 108 are the same as the graduations upon scales 51 and 52, respectively, shown in Figures 14 and 16. A scale 108' is pivotally mounted at 109 at the outer end of one of the monetary levers 104 and projects upwardly through an aperture in a member 110 secured to the outer end of one of the commodity levers 24.

A cage 110 is supported by means of a flexible connection 112 between the cage 110 and the inner arms 113 of the commodity levers 104. Cage 110 is provided with a plurality of compartments 114 which are similar to the compartments 71 of the modification shown in Figure 3.

A further modification of the entire device is shown in Figures 11, 12, and 13. In this modification there are as many monetary levers as there are commodity levers. Sixteen of each type of lever are shown in Figures 11 to 13, but as indicated above, the number of levers may be varied to take care of different economic situations. In this modification, two of the commodity levers 24, which are entirely similar to the equivalent levers shown in Figure 3, are carried by adjustable fulcrum members 16 supported upon a central portion 14 of the base 10. The other commodity levers are supported upon fulcrum members 115 which are mounted upon the central member 14 and extend vertically upward and have knife edges 16 adjacent the upper ends for supporting certain of the monetary levers. These fulcrum members 115 are slotted intermediate their ends at 117 so as to receive the remaining commodity levers 24 upon knife edges 118. Preferably, only the lower knife edges 118 of the fulcrum members 115 are adjustable in a vertical direction. The outer arms 26 of the commodity levers terminate adjacent scales 119 mounted upon the outer peripheral portion 14 of the base 10.

The structure of the inner arms 35 of the commodity levers 24, the flexible ribbons 37, flange 38, sleeve 39, flange 44, and fulcrum members 45, may be identical with the similar structure described with reference to the modification shown in Figure 3. As is the case in Figure 3, the fulcrum members 45 support a pair of monetary levers 48 upon knife edges 17. In this embodiment the monetary levers 48 are master monetary levers and may be identical with the levers 48 of Figure 3 and terminate at the outer ends adjacent scales 120. An alternative form of scales replacing the scales 120 adjacent the outer ends of the master monetary levers 48 are the scales 51 and 52 shown in Figures 14 and 16. A plurality of subordinate monetary levers 121 (fourteen of which are provided in the present embodiment) are supported by knife edges 116 carried by fulcrum members 115 as indicated above. It will be noted that the fulcrums 116 of the subordinate monetary levers 121 are positioned at a greater distance from the arcuate portions 122 thereof than are the fulcrums 17 of the master monetary levers 48 from their corresponding arcuate portions 58. The outer arms of the subordinate monetary levers 121 all terminate adjacent scales 120. All of the monetary levers including the master levers 48 are provided at their outer ends with apertured members 54 through which scales 55 project. The scales 55, as is the case in Figure 3, are pivotally mounted at 56 upon the outer ends of the commodity levers 24 so as to prevent binding between scales 55 and the apertured members 54.

Flexible ribbons 59 are connected to all of the monetary levers 48 and 121 above their respective arcuate portions 122 and 58. The lower ends of these flexible ribbons are connected to an annular plate 123 which is in turn secured to a cage 124 provided with compartments 125 similar to the compartments 71 of Figure 3. In this modification a central standard 126 is secured to and projects upwardly from the central portion 14 of the base through the sleeve 39, a bore 127 formed through the cage 124, and through the annular plate 123. The central standard 126 terminates at its upper end in a knife edge 128 which is adapted to receive an auxiliary lever 63 identical with the lever 63 shown in Figure 4. The central standard 126 is screw threaded intermediate its ends to receive a threaded nut 129 which may be advanced downwardly entirely analogous to the flexible connection 64 shown in Figure 3. The central standard 126 is also provided with graduations 42 visible through the aperture 29. Also the commodity levers 24 may be provided with chains 34 or the alternative construction including the weight 84 shown in Figure 6 for determining the resistance to movement of the commodity levers 24.

The structure of the scales 51 and 52, which may be applied to any of the three modifications of the entire apparatus illustrated in the various figures, is more clearly shown in Figures 14 and 16. The scale 51 is used in depicting an economic situation in which the value of gold or other metallic reserves in terms of currency is varied in order to vary economic conditions as is the case under the present National Recovery Act. This scale is provided with graduations 130 representing the percentage variation in the value of the dollar as the value of gold in terms of dollars is varied. The scale 51 may be also provided with graduations 131, 132, 133, representing the dollar value per ounce of silver when fixed ratios between the values of silver and gold are established at 16 to 1, 12 to 1, and 8 to 1, respectively, and the gold content of the dollar is varied. All of these graduations are coordinated with graduations 134 representing the dollar value of an ounce of gold when the gold content of the dollar, that is to say, the dollar value of the gold is varied to control the economic situation.

The scale 52 shown in Figure 16 is used in depicting an economic situation in which the value of gold in terms of currency is maintained constant as was the case before the present National Recovery Act. The graduation 135 appearing upon this scale represents the dollar value of gold, namely, $20.67 before the National Recovery Act at all points thereon. Similarly, graduations 136 indicate the dollar value per ounce of silver under these conditions when a ratio of 16 to 1 between the values of silver and gold is maintained. The graduations 137 likewise indicate that the gold content of the dollar is 100%, using the period before the National Recovery Act as an index.

Figures 17 and 18 illustrate modifications of the means for attaching monetary levers to the cage. In Figure 17 a monetary lever terminates in an end 138 provided with an aperture 139 receiving a flexible connection 140 which is secured to eyes 141 attached to a cage 142 which may be supported for the cages 71, 110 or 124 of the various modifications of the device. Similarly, Figure 18 shows an end 143 of a monetary lever which terminates in a cross member 144. The cross member 144 is apertured at 145 to receive flexible connections 146 connected to eyes 141 secured to a cage 142.

Figure 20 illustrates a modification of the means for attaching either a monetary lever or a commodity lever to a flange 147 for imparting movement thereto. The end of the lever 148 has a vertical aperture therethrough receiving a screw threaded hook member 149 provided with screw threaded end 150 and a nut 160 for adjustably mounting the hook member 149 in the end 148 of the lever. The hook member 149 terminates at its lower end in a hook 151 which receives one end of a loop 152, the other end of which engages in a hook 153 secured to the flange 147.

In all of the modifications of the device above described the weights of the various levers, cages, interconnecting portions, and the position of the fulcrums are proportioned so that when no weights are positioned upon any of the levers or the cage, the device will be in balance and so that by adjusting the various adjustable fulcrums all of the levers may be brought into mid points of their corresponding scales when the machine is in balance. Either the chains 34 or the equivalent weight 84 attached to the commodity levers maintain the device in stable equilibrium.

The monetary economic balance may be utilized in various ways to show past existing or proposed economic structures. As a specific example, the balance may be employed to depict the gross income of the United States in relation to the monetary structure. The income figures are those compiled by the Department of Commerce in response to Senate Resolution No. 220, 72nd Congress. These figures cover the total income of the United States for the years 1929, 1930, 1931, and 1932, and they are segregated as to national income paid out by industrial divisions. They also show in detail the debt services and savings or losses of each of the divisions. The incomes are divided into 12 divisions, each of which may be depicted on one of the sixteen levers of the commodity portion of the economic balance, and if it is desired to show conditions for 1932, on each lever is placed the proper number of weights, at suitable points, to depict mechanically and quantitatively the income for that year. By the use of markers 29c without weights attached to pins which are fitted into the proper pin holes 29a representing the amounts involved are shown the incomes of the years 1929, 1930, and 1931. In addition to these gross income dipictions, which show comparisons and trends, other detail figures of these years being shown quantitatively (but without weights) such as debt services and savings or losses, by colored pins 29b or other markers. All of the figures of each given year may be placed on markers of the same distinctive coloring or otherwise made similar for purposes of identification.

For convenience in describing the use of the balance, the sixteen commodity levers 24 are indicated on the various drawings by the commodity levers A and I each positioned directly below a monetary lever 48 in the modifications of Figures 1 to 3, directly above a monetary lever 104 in the modification of Figures 8 to 10, and directly below a master monetary lever 48 in the modification shown in Figures 11 to 13. The modification shown in Figures 1 to 3 will be first discussed. The most important showings are those of incomes, which are placed on the levers in the following order:

The companion balances 48 and the cage 60 are thus placed in actual balance, and the combined net weight of all the weights representing money, in even amounts, to wit: $49,500,000,000 are in counterbalance with the combined business weights (to the nearest weights) amounting to $49,000,000,000. By adjusting the fulcrum posts 16 each commodity lever 24 representing an indus-

| Lever | Industrial divisions | Incomes paid out in millions of dollars | | | |
|---|---|---|---|---|---|
| | | 1929 | 1930 | 1931 | 1932 |
| A | Index (R. F. C. & F. R. B. '34): | | | | |
| B | Agriculture | 6341 | 3707 | 4500 | 3442 |
| C | Mining | 2123 | 1776 | 1255 | 651 |
| D | Elec. Light Pow. & Gas | 1306 | 1803 | 1461 | 1216 |
| E | Empty (N. R. A. Com. '34): | | | | |
| F | Manufacturing | 16157 | 16141 | 12488 | 8373 |
| G | Construction | 3135 | 2825 | 1896 | 864 |
| H | Transportation | 6857 | 6199 | 4021 | |
| I | Index (Fd. Exp. Agcy. '34): | | | | |
| J | Communications | 915 | 950 | 897 | 808 |
| K | Trade | 11238 | 10424 | 9103 | 7326 |
| L | Finance | 9778 | 9038 | 7761 | 6019 |
| M | Empty (Other Fed. Agcys. '34): | | | | |
| N | Government | 6459 | 6794 | 6793 | 6794 |
| O | Service | 8643 | 8198 | 6959 | 5434 |
| P | Miscellaneous | 6280 | 5913 | 4013 | 3804 |
| Total | (Indicated by percentage) | 81040 | 75438 | 83289 | 48952 |

In this example each of the unit commodity weights 30 shown in Figure 22 represents one billion dollars. One of these weights placed upon a commodity lever 24 of Figure 3 at graduation 10 will represent one billion dollars gross income, if placed at graduation 20 it will represent two billion dollars, etc. Fractional parts of one billion dollars may be represented by placing a unit weight between the major graduations. Two or more commodity weights may be used upon each lever if necessary.

On the monetary companion balances 48 and the money cage 60 the complete monetary situation of the date June 30, 1932, is depicted in detail, in accordance with records contained in the Reports of the Secretary of the Treasury, Bureau of the Mint, and the Bulletins and Reports of the Federal Reserve Board. On June 30, 1932, the monetary situation of the United States consisted of $3,918,595,807.00 metallic reserve in gold coin and bullion. Monetary weights 65 representing these amounts are equally divided and placed on the two monetary arms 50 at the proper positions to represent a leverage of 11.7 to 1, that being the ratio between the metallic reserve and the total money of the United States other than gold including Federal Reserve and non-member bank credits amounting to $35,670,981,326.00. This money other than gold is separated according to kind and weights 72a representing these sums are grouped in separate compartments 71 in the cage 60. In detail these sums consist of:

| | |
|---|---|
| Gold certificates | $1,490,698,969 |
| U. S. notes | 346,681,416 |
| Treasury notes 1890 | 1,222,150 |
| Federal Reserve notes | 3,028,397,215 |
| Federal Reserve Bank notes | 2,772,040 |
| Standard silver dollars | 540,007,911 |
| Subsidiary silver | 340,882,996 |
| Minor coin | 126,493,326 |
| National Bank notes | 736,674,213 |
| Total | 6,577,830,236 |
| Federal Reserve deposits | 22,960,651,326 |
| Non-member bank deposits | 16,132,500,000 |
| Total money | $45,670,981,326 | trial division may be set to show on scales 28 the actual 1932 percentage of business in terms of the business of 1929 taken as 100 in the preparation of these figures by the Department of Commerce. Under this particular setting the index of the business power of the dollar registers at practically $1.03 on scale 55. The index representing business value registers at approximately 93% on scale 55. The index 42 on the fixed central post registers the total business of 1931 to be approximately 60% of that of 1929. This reading is transmitted to large scale 28 on the index standard of commodity lever A. Normally, indexes should be read when the companion balances 48 are in actual balance and their levers horizontal. The constant aim should be to keep the leverage between the gold and all other classes of money at a point not to exceed 10 to 1, which means a gold coverage of 10%, because when the leverage is greater than 10 and the coverage correspondingly less than 10, the monetary situation has entered the panic zone (according to all past history of the United States) under which prices rapidly recede and tumble precipitately, (the tumble being compounded by the shrinkage of bank deposit credits), when the leverage approximates 14 to 1 and the corresponding coverage has shrunk to approximately 7%. Every effort should be made by the Government to obtain both gold and silver in sufficient amount to insure minimum coverage of 10% of all kinds of money including all bank deposit credits (which is really potential money made usable by the use of checks and drafts). When the Government proposes to advance prices it should first of all arrange for 10% metallic coverage not only for its existing supply of currencies and deposits but for the new amount after the contemplated increase. As foreign countries can not now meet gold commitments, the coverage metal, over and above the local budgeted production, should be made up with silver purchased abroad by both Government and individuals. When gold export is prohibited, silver purchase settlement can be made only by the export of goods. If credits are increased by the issuance of currencies and the distribution of bonds, resulting in correspondingly increased bank credits without maintaining the metallic coverage, prices will go up in terms of depreciating dollars but actually descend in terms of gold. The gold value index is the fixed semi-circular scale 52 extending upwardly from index scales 28 which registers with the outer end of one of the monetary arms, 50. On one side is a scale 136 showing gold values with the old price as unity and graduated to higher prices, and a scale 137 which shows gold value with the new price as unity, graduated both higher and lower.

When a monetary economic balance situation is to be corrected, it must be taken into consideration that business resistance respectively increases and decreases with decrease or increase of business and must be represented by the change of weights before there can be a change of prices. The complete moves to effect a change in business and prices must take into consideration many factors which are indicated by the monetary economic balance.

As another specific example, the monetary economic balance may show the relations between the monetary situation and the annual business of the country, and specially may show currency velocities. The leverage of the monetary balances 48 is applied directly to the business load by connecting the bottom of the cage 60 to the top of the fixed vertical post 40 by attaching a loop or flexible connection 64 to fastenings made for the purpose.

When currency velocity is to be studied, weights representing currencies (instead of the metallic base) are placed at the correct balancing points on the monetary arms 59 to balance the business levers when they are loaded with weights to represent the total business of the country as done by checks; the unit values of the weights for the occasion being five billion dollars per unit currency weight (each arm 50 to carry like weights at equal leverage points) and ten billions per unit business weight. The total business may be segregated as to kind, Federal Reserve districts, (or otherwise, geographically) as to business uses or in any other special manner and their individual velocities shown by distinctive markers placed in the pin holes 29a which are drilled for this and similar purposes at close and measured intervals along the tops for their full length of the monetary arms.

When a very detailed and exhaustive study is to be made of currency velocities and the intimate relationships between capital and the monies of the separate divisions, the monetary economic balance has a companion monetary arm for every business arm, as shown in Figures 11 to 13. In such units, however, there are two master companion monetary balances which are of sufficient length, leverage, ratio and strength to carry together the weights representing either the gold stock or total currencies and credits to balance the entire business load which will permit, at times, all other monetary arms to be used to depict details of bank loans, etc., for comparisons with currency velocities of the capital engaged by the separate divisions of business by the use of distinctive and so-called weightless markers placed in pinholes.

Index scales are provided for each companion set of monetary arms and business balances. In order to portray an analysis of the affairs of the country with sufficient precision upon which to base governmental financial action, there should be a number of machines so as to fully take advantage of all data collected by Government agencies, and particularly the different sets of figures showing national income paid out by types of payments and by industrial divisions, as compiled by the Department of Commerce.

The right hand monetary arm 28 indicates on a scale 135 the price of gold to be $20.67 per ounce at every vertical position throughout its movement, as it is used exclusively to depict conditions existing prior to the change of the gold price. The left hand monetary arm is used to depict on a scale 53 all changes in the prices of gold, silver, and the dollar, following the establishment of the $35.00 gold price. Metal coverage and currency velocities are depicted on both monetary arms. When the left hand monetary arm is level and all indexes read at 100, this arm indicates a gold price of $35.00 per ounce. The scale is marked downwardly to $24.23 per ounce, which is the bottom of the scale, and upwardly to $51.67 per ounce, the various values of silver and the dollar being marked parallel to the price of gold. When making a mechanical analogy of the situation that requires gold to be maintained at $35.00 per ounce, corresponding to the dollar price of 59.06 cents, all adjustments must be made so that the left hand monetary arm is horizontal.

In addition to the two specific examples above given the monetary economic balance is applicable to many other phases of national and international economic conditions as they now exist or to past or proposed economic situations. Also the invention finds utility in any large financial structure for integrating and presenting a graphical representation of the financial conditions of its various subdivisions. For example, large department or chain stores or parent corporations having a number of subsidiaries may utilize the invention to graphically and quantitatively present the financial conditions of their various subdivisions and indicate desirable changes in their financial structure. Many other uses and adaptations of the invention are possible and will occur to the skilled economist.

While I have described and illustrated embodiments of my invention in the foregoing specification, it is to be understood that various modifications may be made therein within the scope of the following claims.

Having described my invention, what I claim is:

1. A device for depicting an economic situation comprising means for mechanically balancing weights representing monetary values against other weights representing other monetary values and means for simultaneously balancing the sum of all said weights representing monetary values against weights representing commodity values.

2. A device for depicting an economic situation comprising means for mechanically balancing weights representing monetary values against other weights representing other monetary values, means for simultaneously balancing the sum of all said weights representing monetary values against weights representing commodity values, and means for indicating the position of said balancing means and provided with scales showing economic factors.

3. A device for depicting an economic situation comprising means for mechanically balancing weights representing monetary values against other weights representing other monetary values, means for simultaneously balancing the sum of all said weights representing monetary values against weights representing commodity values, and means providing for controlled resistance to movement of said balancing means.

4. In a device for depicting an economic situation, a balance having an arm for receiving weights representing economic values, a cage member for receiving weights representing other economic values, attached to another arm of said balance, a fulcrum for supporting said balance, a second balance, and means for supporting said fulcrum on an arm of said second balance.

5. In a device of the character described a base, a system of balance levers fulcrumed upon said base intermediate their ends to each provide a pair of arms, one arm of each lever being commonly connected to a movable connecting member, and a second system of balance levers fulcrumed upon said connecting member.

6. In a device for depicting an economic situation, a base, a movable connecting member, a plurality of balance levers fulcrumed intermediate their ends on said base, each of said balance levers having one arm connected to said connecting member for supporting the same and another arm extending radially outward from said central standard and adapted to receive weights representing economic values and a plurality of balance levers fulcrumed intermediate their ends upon said connecting member, each of said last mentioned balance levers having one arm connected to support a central cage member adapted to receive weights representing economic values and another arm extending radially outward therefrom adapted to receive weights representing economic values.

7. In a device for depicting an economic situation, a base, a movable connecting member, a plurality of balance levers fulcrumed intermediate their ends on said base, each of said balance levers having one arm connected to said connecting member for supporting the same and another arm extending radially outward from said central standard and adapted to receive weights representing economic values, a plurality of balance levers fulcrumed intermediate their ends upon said connecting member, each of said last mentioned balance levers having one arm connected to support a central cage member adapted to receive weights representing economic values and another arm extending radially outward therefrom adapted to receive weights representing economic values, and scales adjacent the ends of the radially extending arms of all of said balance levers to indicate the position thereof.

8. In a device for depicting an economic situation, a base, a movable connecting member, a plurality of balance levers fulcrumed intermediate their ends on said base, each of said balance levers having one arm connected to said connecting member for supporting the same and another arm extending radially outward from said central standard and adapted to receive weights representing economic values, a plurality of balance levers fulcrumed intermediate their ends upon said connecting member, each of said last mentioned balance levers having one arm connected to support a central cage member adapted to receive weights representing economic values and another arm extending radially outward therefrom adapted to receive weights representing economic values, and a plurality of balance levers fulcrumed upon said base each having an arm connected to support said cage and another arm extending radially outward therefrom to receive weights representing economic values.

9. In a device for depicting an economic situation, a base, a movable connecting member, a plurality of balance levers fulcrumed intermediate their ends on said base, each of said balance levers having one arm connected to said connecting member for supporting the same and another arm extending radially outward from said central standard and adapted to receive weights representing economic values, a plurality of balance levers fulcrumed intermediate their ends upon said connection member, each of said last mentioned balance levers having one arm connected to support a central cage member adapted to receive weights representing economic values and another arm extending radially outward therefrom adapted to receive weights representing economic values, and a balance lever fulcrumed upon said cage, having arms adapted to receive weights representing economic values.

10. In a device for depicting an economic situation, a base having a central upwardly extending central standard, a connecting member vertically slidable upon said central standard, a plurality of balance levers fulcrumed intermediate their ends on said base, each of said balance levers having one arm connected to said connecting member for supporting the same and another arm extending radially outward from said central standard and adapted to receive weights representing economic values, a plurality of balance levers fulcrumed intermediate their ends upon said connecting member, each of said last mentioned balance levers having one arm connected to support a central cage member adapted to receive weights representing economic values and another arm extending radially outward therefrom adapted to receive weights representing economic values, and means for detachably connecting said cage member to said central standard.

11. In a device for depicting an economic situation, a base having a central upwardly extending central standard, a connecting member vertically slidable upon said central standard, a plurality of balance levers fulcrumed intermediate their ends on said base, each of said balance levers having one arm connected to said connecting member for supporting the same and another arm extending radially outward from said central standard and adapted to receive weights representing economic values, a plurality of balance levers fulcrumed intermediate their ends upon said connecting member, each of said last mentioned balance levers having one arm connected to support a central cage member adapted to receive weights representing economic values and another arm extending radially outward therefrom adapted to receive weights representing economic values, and a balance lever fulcrumed upon said central standard and having arms adapted to receive weights representing economic values.

12. In a device for depicting an economic situation, a base, a movable connecting member, a plurality of balance levers fulcrumed intermediate their ends on said base, each of said balance levers having one arm connected to said connecting member for supporting the same and another arm extending radially outward from said central standard and adapted to receive weights representing economic values, a plurality of balance levers fulcrumed intermediate their ends upon said connecting member, each of said last mentioned balance levers having one arm connected to support a central cage member adapted to receive weights representing economic values and another arm extending radially outward therefrom adapted to receive weights representing economic values, said outwardly extending arms of all said balance levers having a plurality of means for attaching substantially weightless markers.

13. In a device for depicting an economic situation, a base, a movable connecting member, a plurality of balance levers fulcrumed intermediate their ends on said base, each of said balance levers having one arm connected to said connecting member for supporting the same and another arm extending outward from said central standard and adapted to receive weights representing economic values, a plurality of balance levers fulcrumed intermediate their ends upon said connecting member, each of said last mentioned balance levers having one arm connected to support a central cage member adapted to receive weights representing economic values and another arm extending radially outward therefrom adapted to receive weights representing economic values, and a scale extending between one of said outwardly extending arms of one of said first mentioned balance arms and one of said outwardly extending arms of one of said last mentioned balance arms and carried by one of said outwardly extending arms.

14. A device for depicting an economic situation comprising means for mechanically balancing masses representing monetary values against other masses representing other monetary values, means for simultaneously balancing the combined mass of all said masses representing monetary values against masses representing commodity values, and means for indicating the position of said balancing means and provided with scales showing economic factors.

15. A device for depicting an economic situation comprising means for mechanically balancing masses representing monetary values against other masses representing other monetary values, means for simultaneously balancing the combined mass of all said masses representing monetary values against weights representing commodity values, and means providing for controlled resistance to movement of said balancing means.

WALTER E. TRENT.